3,388,111
METHOD OF ALKYLATING POLYSTYRENE
Robert H. Allen and Larry D. Yats, Midland, Mich., assignors to The Dow Chemical Company, Midland, Mich., a corporation of Delaware
No Drawing. Continuation-in-part of application Ser. No. 350,126, Mar. 6, 1964. This application Feb. 9, 1967, Ser. No. 614,804
4 Claims. (Cl. 260—93.5)

ABSTRACT OF THE DISCLOSURE

A process for alkylating polystyrene which comprises contacting polystyrene dissolved in an inert solvent with an alkyl ester of p-toluene sulfonic acid and $BF_3$ at temperatures between 25° and 75° C.

---

This application is a continuation-in-part of our prior application Ser. No. 350,126 filed Mar. 6, 1964, now abandoned.

This invention relates to a method of alkylating polystyrene. More particularly, it concerns the alkylation of polystyrene with an alkyl sulfonate in the presence of a boron trifluoride catalyst whereby there is no significant amount of degradation of the polymer molecules.

Polystyrene has been used widely as a molding resin owing to its low cost, ease of fabrication, light weight, etc. For some uses it is desirable that the resin have high heat distortion, improved solvent resistance and the like. These desirable properties can be provided, for example, by grafting a reactive group on the aromatic nuclei of the polymer so that they can be cross-linked with a reactive compound. Thus, this invention provides an improved method of attaching alkyl groups to thermoplastic polystyrene whereby reactive molecules can be attached to the alkyl groups to reduce the plasticity of the resin or otherwise alter its physical properties.

Previous methods for alkylating polystyrene with an α-olefin in the presence of a Friedel-Crafts catalyst have been handicapped by two problems. The highly active catalysts which are required to produce alkylation break the polymer chains, thereby degrading the polymer into a lower molecular weight resin. When low catalyst levels are used to avoid this problem of degradation, there is little alkylation of the polystyrene and the long reaction time involved in attempting to produce alkylation at the milder conditions results in homopolymerization of the olefin, particularly with the lower alkenes.

We have found that polystyrene can be alkylated with a low molecular weight alkane without degrading the polymer by reacting the polymer with an alkyl ester of p-toluene sulfonic acid in the presence of a $BF_3$ catalyst. In the presence of this catalyst the alkyl group is split from the ester and attached to an aromatic nucleus of the polymer, leaving the sulfonic acid as a residue or by-product of the alkylation.

The method can be illustrated by the following examples describing the propylation of polystyrene.

Example 1

26 parts by weight of polystyrene were dissolved in 494 parts of o-dichlorobenzene in a reaction chamber. 26.6 parts of isopropyl-p-toluene sulfonate were added, then the solution stirred and heated to 50–55° C. $BF_3$ was passed through the solution slowly for six hours. At the end of that time the solution was washed with water to recover the polymer free of sulfonic acid, catalyst and solvent. The polystyrene used in this alkylation had a viscosity of 21.4 centipoises in a 10 percent toluene solution at 25° C. The alkylated product had a viscosity of 23.2 centipoises at the same concentration and temperature, indicating there was no degradation of the polymer. Infra-red analysis showed the product contained 0.4 isopropyl group per aromatic ring with most of the isopropyl groups attached at the para position.

Example 2

This alkylation was conducted in the same manner as Example 1 with the only difference being that the polystyrene had a higher molecular weight. The viscosity of a 10 percent solution in toluene at 25° C. was 71 centipoises. The viscosity of the alkylated product was 76.5 centipoises.

In addition to the isopropyl esters of p-toluene sulfonic acid, other alkyl esters and particularly those of secondary alkyls such as those of secondary butyl and cyclohexyl may be used as the alkylating agent.

The solvent for the polystyrene and alkylating agent may be any of numerous solvents which are inert in the reaction mixture. In addition to the o-dichlorobenzene used in the examples above, we may use trichlorobenzene, ethylene dichloride, carbon tetrachloride, methylene chloride, nitrobenzene and the like as solvents.

The alkylation can be carried out at temperatures between about 0 and 100° C. and preferably 25 to 75° C. to get an economical reaction rate without significant polymer degradation. The reaction time is between about 0.5 and 24 hours, depending on the temperature of the reaction mixture.

The amount of alkyl toluene sulfonate which may be used to alkylate the polymer varies from about 0.01 to 3.0 moles of the sulfonate per mole of aromatic nucleus in the polymer. At the lower mole ratio, i.e. 0.01, the polymer would be very slightly alkylated so that little grafting or cross-linking could be produced. At the 3.0 mole ratio each aromatic ring in the polymer would receive alkyl groups at three positions, producing a resin which has the potential of being highly grafted or cross-linked. This highly alkylated polystyrene is difficult to obtain owing to stearic hindrance.

The anhydrous $BF_3$ catalyst is consumed in the alkylation so that it is necessary to add it continuously during the reaction. This can be accomplished quite easily by continuously bubbling the catalyst into the stirred reaction mixture. The pressure at which the alkylation is conducted is not critical. A pressure is ordinarily used which avoids loss of solvent and provides sufficient solubility of the gaseous catalyst in the reaction mixture.

We claim:

1. In a method of alkylating polystyrene dissolved in an inert solvent by reacting the polystyrene with an alkyl ester of p-toluene sulfonic acid, the improvement which consists in carrying out the reaction in admixture with $BF_3$ and a reaction temperature between 25° C. and 75° C.

2. A method according to claim 1 wherein the mole ratio of said alkyl ester to aromatic rings in said polystyrene is between about 0.01 and 3:1.

3. A method of propylating polystyrene which comprises dissolving said polystyrene and isopropyl p-toluene sulfonate in o-dichlorobenzene then passing $BF_3$ through said solution at temperatures between 25° and 75° C.

4. A method of alkylating polystyrene which comprises dissolving polystyrene and an alkyl ester of p-toluene sulfonic acid in an inert solvent and contacting said solution with $BF_3$ at temperatures between 25 and 75° C., whereby said alkyl ester reacts with said polystyrene, then washing said solution with water, and separating alkylpolymer free of solvent, catalyst, and p-toluene sulfonic acid.

References Cited

FOREIGN PATENTS 664,692    1/1952    Great Britain.

OTHER REFERENCES

Chem. Abstracts, vol. 46, July–September 1952, p. 8043.

Chem. Abstracts, vol. 48, July–August 1954, p. 7558.

JAMES A. SEIDLECK, *Primary Examiner.*